United States Patent
Xu

(10) Patent No.: US 9,654,020 B2
(45) Date of Patent: May 16, 2017

(54) SMART MATCHING STEP-DOWN CIRCUITS AND TRAVEL-USE POWER CONVERSION DEVICES

(71) Applicant: Guangdong BESTEK E-commerce Co., Ltd., Shenzhen (CN)

(72) Inventor: Xinhua Xu, Shenzhen (CN)

(73) Assignee: Guangdong BESTEK E-commerce Co., Ltd., Shenzhen (CN)

( * ) Notice: Subject to any disclaimer, the term of this patent is extended or adjusted under 35 U.S.C. 154(b) by 0 days.

(21) Appl. No.: 15/112,420

(22) PCT Filed: Dec. 26, 2014

(86) PCT No.: PCT/CN2014/095206
§ 371 (c)(1),
(2) Date: Jul. 18, 2016

(87) PCT Pub. No.: WO2016/049988
PCT Pub. Date: Apr. 7, 2016

(65) Prior Publication Data
US 2016/0329825 A1    Nov. 10, 2016

(30) Foreign Application Priority Data
Sep. 30, 2014    (CN) .......................... 2014 1 0521723

(51) Int. Cl.
*H02M 7/521* (2006.01)
*H02M 5/458* (2006.01)
(Continued)

(52) U.S. Cl.
CPC ............. *H02M 5/458* (2013.01); *H02M 1/08* (2013.01); *H02M 1/10* (2013.01); *H02M 3/156* (2013.01); *H02M 1/32* (2013.01)

(58) Field of Classification Search
CPC ........ H02M 1/12; H02M 1/14; H02M 1/4266; H02M 1/4233; H02M 5/40; H02M 5/45;
(Continued)

(56) References Cited

U.S. PATENT DOCUMENTS

2006/0113922 A1*  6/2006  Ribarich ............ H05B 41/2882
                                                        315/209 R
2007/0126372 A1*  6/2007  Huang ............... H05B 41/2825
                                                        315/291
(Continued)

FOREIGN PATENT DOCUMENTS

CN        102684511 A      9/2012
CN        202889210 U      4/2013
(Continued)

OTHER PUBLICATIONS

International Publication for PCT/CN2014/095206.
International Search Report for PCT/CN2014/095206.

*Primary Examiner* — Adolf Berhane

(57) ABSTRACT

Provided is a smart matching step-down circuit, comprising an alternating current input terminal (10), a rectifier filter circuit (20), a switching circuit (30), a high voltage BUCK control step-down circuit (40), a floating zero potential control circuit (41), a voltage detection and feedback circuit (50), a PWM controller (52), a full-bridge DC/AC converter circuit (60), an alternating current output terminal (70), an output voltage detection circuit (62), and a conversion controller (80); the high voltage BUCK control step-down circuit comprises a step-down inductor (L1) and a step-down capacitor (C18); the first end of the step-down inductor is connected to the output terminal of the switching circuit; the second end of the step-down inductor is connected to the positive electrode of the step-down filter capacitor, and is used for stepping down and filtering the pulse voltage, then outputting a second direct current; the floating zero potential (Continued)

control circuit comprises a flyback diode (D11, D12); the cathode of the flyback diode is connected to the circuit ground, together with the first end of the step-down inductor; the anode of the flyback diode is connected to the floating ground (GND), together with the negative electrode of the step-down filter capacitor; the smart matching step-down circuit can step down a wide voltage, and is broadly adaptable.

16 Claims, 5 Drawing Sheets

(51) Int. Cl.
    *H02M 1/08*     (2006.01)
    *H02M 1/10*     (2006.01)
    *H02M 3/156*     (2006.01)
    *H02M 1/32*     (2007.01)

(58) Field of Classification Search
    CPC ...... H02M 5/451; H02M 5/452; H02M 5/458; H02M 5/4585; H02M 3/33507; H02M 7/521; H02M 7/5387; H02M 7/53871
    USPC ....... 363/34, 37, 39–41, 44, 84, 95, 98, 125, 363/131, 132
    See application file for complete search history.

(56) References Cited

U.S. PATENT DOCUMENTS

| | | | |
|---|---|---|---|
| 2008/0137383 A1 | 6/2008 | Chang et al. | |
| 2010/0237793 A1* | 9/2010 | Hasegawa | H05B 41/2988 315/224 |
| 2010/0327776 A1* | 12/2010 | Yufuku | H05B 41/042 315/307 |
| 2011/0248640 A1* | 10/2011 | Welten | H05B 33/083 315/210 |
| 2012/0169240 A1* | 7/2012 | Macfarlane | H02M 1/4225 315/152 |
| 2013/0026938 A1* | 1/2013 | Zhang | H05B 41/38 315/224 |
| 2014/0176049 A1* | 6/2014 | Yamada | H02J 7/025 320/107 |
| 2014/0265900 A1* | 9/2014 | Sadwick | H05B 33/0803 315/200 R |
| 2014/0265935 A1* | 9/2014 | Sadwick | H05B 33/0815 315/307 |

FOREIGN PATENT DOCUMENTS

| | | |
|---|---|---|
| CN | 103078549 A | 5/2013 |
| CN | 103354423 A | 10/2013 |
| CN | 104242671 A | 12/2014 |

* cited by examiner

SMART MATCHING STEP-DOWN CIRCUITS AND TRAVEL-USE POWER CONVERSION DEVICES

BACKGROUND

1. Technical Field

The present disclosure generally relates to a power circuit, and especially relates to a smart matching step-down circuit and a travel-use power conversion device.

2. Description of Related Art

Power circuits supply the power to electric equipment. Conventionally, the power circuits include alternating current (AC) power circuits and direct current (DC) power circuits. However, the voltages applicable for different areas and countries are different, but the nominal voltage of the electrical equipment may be the same. Thus, the electrical equipment cannot be directly adapted to the power supply in different countries. Generally, power conversion device has to be adopted to convert the power supply.

Currently, the power conversion devices convert one fixed power voltage into another fixed power voltage, such as converting the AC of 220V to the AC of 110V, so as to adapt to the power voltage of American standard and Europe standard. With respect to such power conversion device, the input end can only be applicable to one fixed voltage. In other words, the applicable range of such power conversion device is small, that is, only the one-to-one conversion is available, and thus is not convenient.

SUMMARY

The disclosure relates to a smart matching step-down circuit and a travel-use power conversion device.

In one aspect, a smart matching step-down circuit includes: an alternating current (AC) input terminal connects to an external power supply to input a first AC within a predetermined voltage range; a rectifier filter circuit connects to the AC input terminal for rectifying and filtering waveforms of the first AC to form a first direct current (DC); an input end of a switching circuit connects to the rectifier filter circuit, and in response to control signals, the switching circuit is turned on or off to output a pulse voltage; a high voltage BUCK control step-down circuit includes a voltage step-down inductor, and a voltage step-down filter capacitor, wherein a first end of the voltage, step-down inductor connects to an output end of the switching circuit, and a second end of the voltage step-down inductor connects to a positive pole of the voltage step-down filter capacitor for performing a voltage step-down process and a filtering process toward the pulse voltage so as to output a second DC; a floating zero potential control circuit includes fly-back diodes, a cathode of the fly-back diodes and the first end of the voltage step-down inductor cooperatively connect to a floating ground; a voltage detection and feedback circuit includes an input end connecting to the second end of the voltage step-down inductor to detect the second DC so as to generate a feedback message; a PWM controller includes a feedback end connecting to an output end of the voltage detection and feedback circuit, and a control end connecting to a controlled end of the switching circuit, in response to the feedback message, the PWM controller is configured to output control signals controlling a pulse width of the pulse voltage; a full-bridge DC/AC converter circuit includes an input end connecting to a positive pole of the voltage step-down filter capacitor to convert the second DC to the second AC; an AC output end connects to the output end of the fall-bridge DC/AC converter circuit to output the second AC; an output voltage detection circuit connects to the AC output end to sample voltages of the second AC from the AC output end so as to generate a first sampling voltage; and a conversion controller connecting to the output voltage detection circuit and the full-bridge DC/AC converter circuit, the conversion controller is configured to controlling a duty cycle ratio of outputted waveform of the full-bridge DC/AC converter circuit in accordance with the first sampling voltage so as to stabilize the second AC.

Wherein the smart matching step-down circuit farther includes an output current detection circuit connecting to current detection ends of the AC output terminal and the conversion controller, and the output current detection circuit is configured to sample current of the second AC from the AC output terminal to generate a sampling current; the conversion controller controls the duty cycle ratio of the outputted waveforms of the full-bridge DC/AC converter circuit in accordance with the first sampling voltage and the sampling current to stabilize the second AC.

Wherein the switching circuit includes a MOS transistor and a switch driving circuit, a drain of the MOS transistor is the input end of the switching circuit, a gate of the MOS transistor is a controlled end of the switching circuit, and a source of the MOS transistor is the output end of the switching circuit.

Wherein the voltage detection and feedback circuit includes an optoelectronic coupler, a reference stabilized source, and a voltage sampling circuit, a positive end of at least one light emitting diode (LED) of the optoelectronic coupler connects to a second end of the voltage step-down inductor via a power supply circuit, and a negative end of the LED of the optoelectronic coupler connects to a cathode of the reference stabilized source, an anode of the reference stabilized source is grounded, and a reference pole of the reference stabilized source connects to the second end of the voltage step-down inductor via the voltage sampling circuit, and a photo-triode of the optoelectronic coupler connects to the feedback end of the PWM controller.

Wherein the full-bridge DC/AC converter circuit includes an inverter-bridge having a first MOS transistor, a second MOS transistor, a third MOS transistor, and a fourth MOS transistor, gates of the first MOS transistor, the second MOS transistor, the third MOS transistor, and the fourth MOS transistor respectively connects to one MOS driving circuit, and the MOS driving circuit connects to the corresponding PWM control end of the conversion controller; a source of the second MOS transistor is a fire-wire end of the AC output terminal, and a source of the fourth MOS transistor is a zero-line end of the AC output terminal.

Wherein the output current detection circuit includes a thirty-third resistor, a thirty-fourth resistor, and a thirty-fifth resistor, ends of the thirty-third resistor, the thirty-fourth resistor, and the thirty-fifth resistor connect to a source of the fourth MOS transistor and the voltage detection end of the conversion controller, and the other ends of the thirty-third resistor, the thirty-fourth resistor, and the thirty-fifth resistor connect to the floating ground.

Wherein the output voltage detection circuit includes a rectifying bridge, an AC L pin connects to the source of the first MOS transistor and a L pin of the conversion controller, an AC N pin connects to the source of the fourth MOS transistor and the N pin of the conversion controller, a DC positive pole pin of the rectifying bridge connects to the floating ground via a twenty-first capacitor, an DC positive pole pin further connects to a VB pin of the conversion controller, and the DC negative pole pin connects to the floating ground.

Wherein the smart matching step-down circuit further includes an over-current detection circuit, the over-current detection circuit includes a twenty-ninth resistor and a twenty-second resistor, one end of the twenty-ninth resistor connects to the output end of the switching circuit, and the other end of the twenty-ninth resistor is grounded, one end of the twenty-second resistor connects to the output end of the switching circuit, and the other end of the twenty-second resistor connects to a current detection end of the PWM controller.

In another aspect, a travel-use power conversion device incorporated the above the smart matching step-down circuit.

In view of the smart matching step-down circuit and the travel-use power conversion device, the AC input terminal inputs the first DC within a predetermined voltage range, i.e., AC90-265V. The rectifier filter circuit rectifies and filters the waveforms to form the first DC of high voltage. In response to the control of the PWM controller, the switching circuit outputs the first DC via the pulse format so as to output the pulse voltage. The pulse voltage is then applied with the voltage step-down process by the high voltage BUCK control step-down circuit to generate the second DC of low voltage. In addition, the floating zero potential control circuit controls the circuit in the floating mauler, and stabilizes the second DC in accordance with the change of the high-voltage first AC outputted by the rectifier filter circuit. The second DC is converted by the full-bridge DC/AC converter circuit and is applied with the PWM adjustment by the conversion controller so as to output a stable second AC, i.e., which is generally around 110V. Thus, the wide voltage may be stepped down. As the input end may be the AC within the predetermined voltage range, such solution may be applicable to a large scope, such as being incorporated into the travel-use power conversion device.

Figure 1:
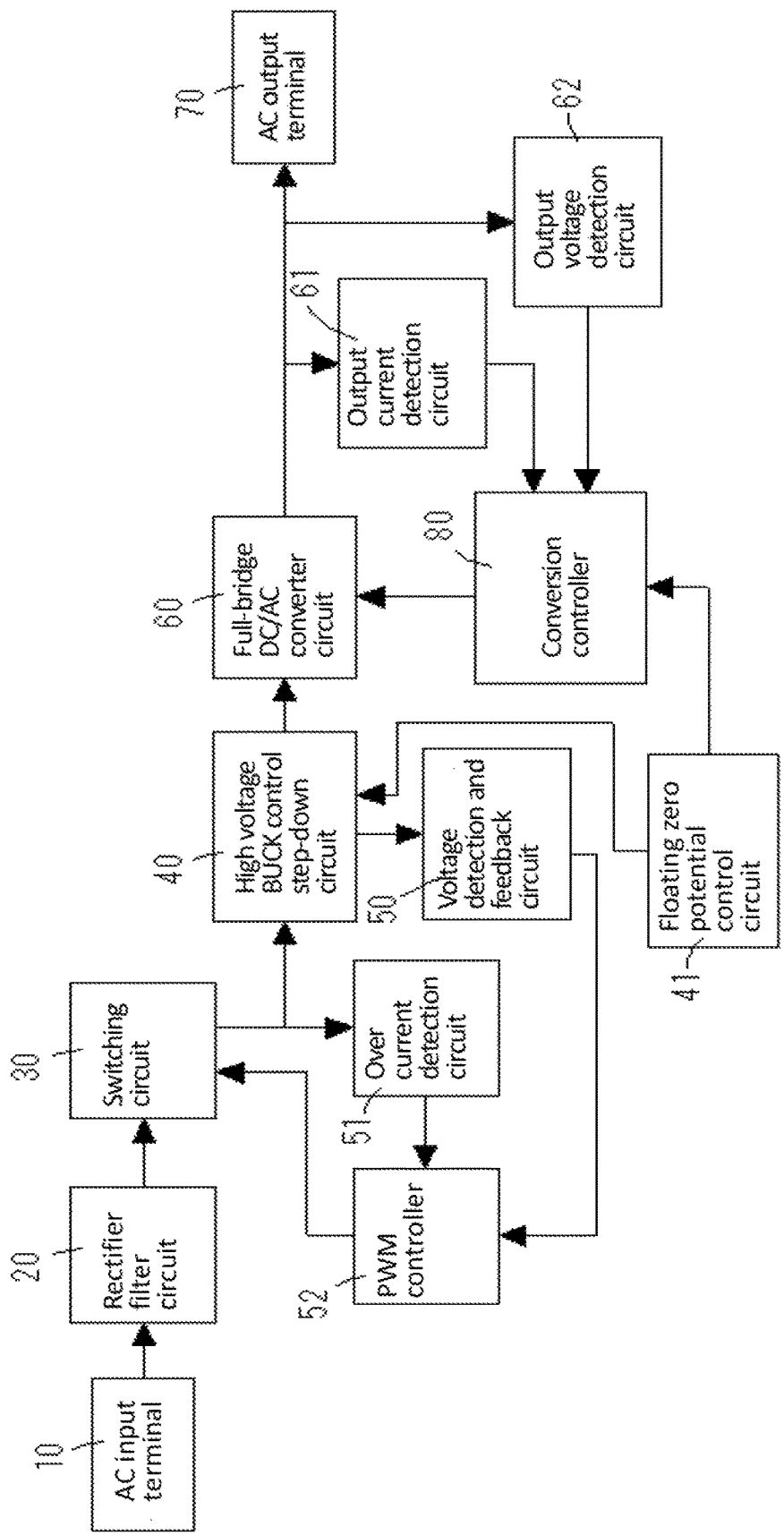
FIG. 1 is a circuit diagram of the smart matching step-down circuit in accordance with one embodiment.

The implementation, the features, and the advantages of the claimed invention will be described by the embodiments together with the accompanying drawings.

DETAILED DESCRIPTION

The disclosure is illustrated by way of example and not by way of limitation in the figures of the accompanying drawings, in which like reference numerals indicate similar elements. The embodiments described in accordance with the drawings are only examples, and thus the claimed invention is not limited thereto.

Figure 3:
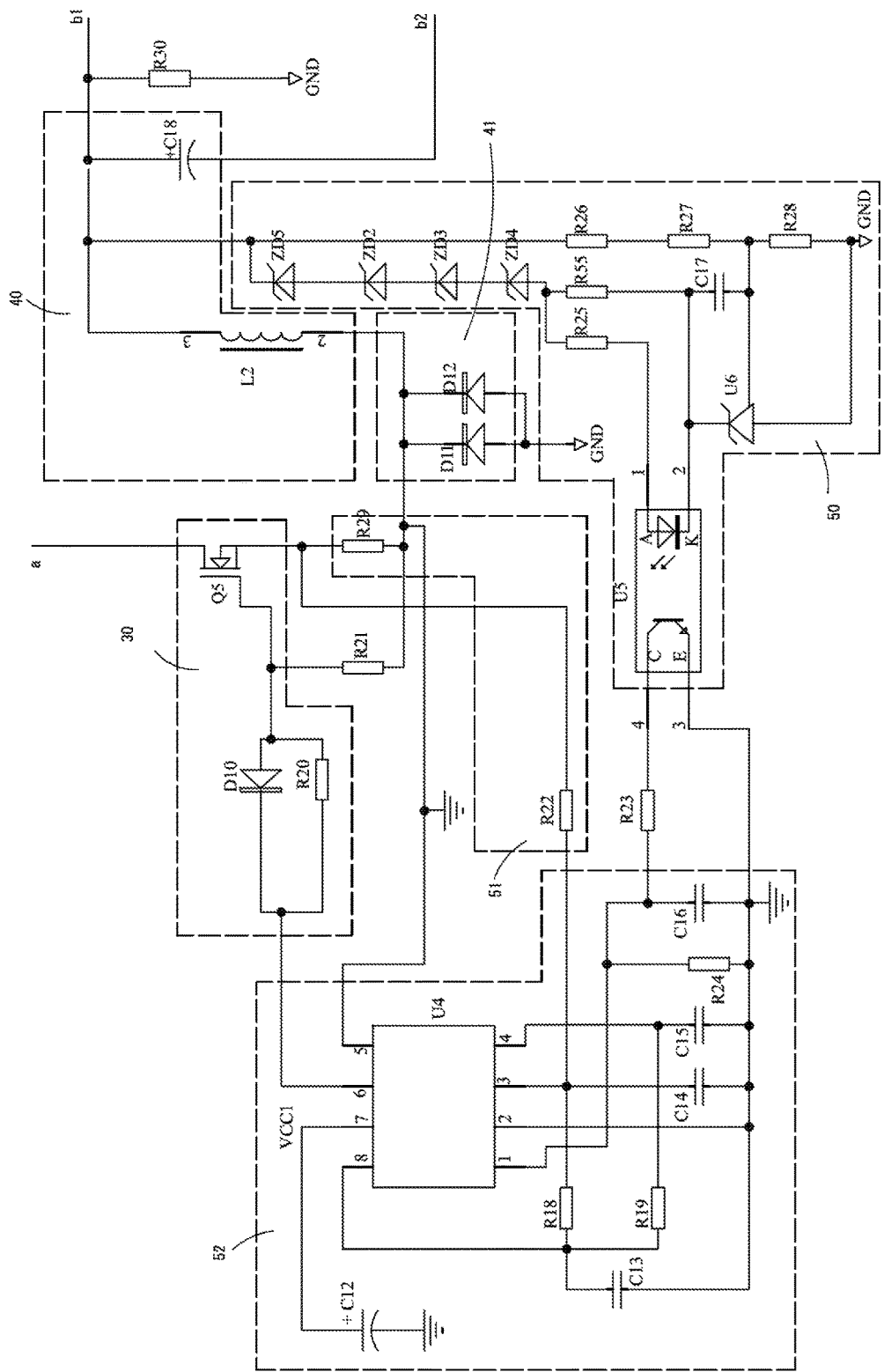
FIG. 3 is a circuit diagram of a switching circuit, a high voltage BUCK control step-down circuit, a floating zero potential control circuit, a voltage detection and feedback circuit, and a PWM controller of the smart matching step-down circuit in accordance with one embodiment.

Referring to FIGS. 1 and 3, the smart matching step-down circuit includes an alternating current (AC) input terminal 10, a rectifier filter circuit 20, a switching circuit 30, a high voltage BUCK control step-down circuit 40, a floating zero potential control circuit 41, a voltage detection and feedback circuit 50, a PWM controller 52, a full-bridge DC/AC converter circuit 60, an AC output terminal 70, an output voltage detection circuit 62, and a conversion controller 80.

Specifically, the AC input terminal 10 connects to an external power supply to input a first AC within a predetermined voltage range. For instance, the predetermined voltage range may be from AC 90 to AC 265V, that is, the wide voltage range is from AC 90 to AC 265V. The rectifier filter circuit 20 connects to the AC input terminal 10 for rectifying and filtering waveforms of the first AC to form a first direct current (DC). An input end of the switching circuit 30 connects to the rectifier filter circuit 20, and in response to control signals, the switching circuit 30 is turned on or off to output a pulse voltage. That is, when the switching circuit 30 in an on or off state, the switching circuit 30 outputs a direct pulse, which is the above pulse voltage.

The high voltage BUCK control step-down circuit 40 includes a voltage step-down inductor (L1), and a voltage step-down filter capacitor (C18), wherein a first end of the voltage step-down inductor (L1) connects to the output end of the switching circuit 30, and a second end of the voltage step-down inductor (L1) connects to a positive pole of the voltage step-down filter capacitor (C18) for performing the voltage step-down and filtering processes toward the pulse voltage outputted by the switching circuit 30 so as to output a second DC.

The floating zero potential control circuit 41 includes fly-back diodes (D11, D12). A cathode of the fly-back diodes (D11, D12) and the first end of the voltage step-down inductor (L1) cooperatively connect to a floating ground. An anode of the fly-back diodes (D11, D12) and a negative pole of the voltage step-down filter capacitor (C18) cooperatively connect to a floating ground. The smart matching step-down circuit is capable of stepping down a wide voltage, and may be broadly adaptable. The floating zero potential control circuit is configured to control the second DC in a floating manner. Specifically, the second DC is stabilized in accordance with a change of the high-voltage first AC outputted by the rectifier filter circuit 20. That is, under the control of the floating zero potential control circuit, the voltage value of the second DC is stable after being outputted by the high voltage BUCK control step-down circuit 40, regardless of the voltage value inputted from the AC input end as long as the voltage value is in the range from AC 90 to 265 V. Generally, the voltage value of the second DC may be around 140 V.

The input end of the voltage detection and feedback circuit 50 connects to the second end of the voltage step-down inductor (L1) of the high voltage BUCK control step-down circuit 40 to detect the second DC so as to generate a feedback message. A feedback end of the PWM controller 52 connects to the output end of the voltage detection and feedback circuit 50, and a control end of the PWM controller 52 connects to a controlled end of the switching circuit 30 so as to control a pulse width of the pulse voltage. That is, the voltage detection and feedback circuit 50 and the PWM controller 52 are configured to control a duty cycle ratio of the outputted waveform of the switching circuit 30 so as to adjust the pulse width of the pulse voltage.

An input end of the full-bridge DC/AC converter circuit 60 connects to the positive pole of the voltage step-down filter capacitor (C18) to convert the second DC to the second AC. Specifically, the input end of the full-bridge DC/AC converter circuit 60 connects to the output end of the high voltage BUCK control step-down circuit 40 to convert the second DC to the second AC. The AC output end connects to the output end of the full-bridge DC/AC converter circuit 60 to output the second AC, which is a stable and fixed voltage, such as AC 110V, for supplying the power to the electric equipment of American standard and Europe standard. The output voltage detection circuit 62 connects to the AC output end to sample the voltages of the second AC from the AC output end so as to generate a first sampling voltage. The conversion controller 80 connects to the output voltage detection circuit 62 and the full-bridge DC/AC converter circuit 60. The conversion controller 80 is configured to controlling the duty cycle ratio of the outputted waveform of the full-bridge DC/AC converter circuit 60 in accordance with the first sampling voltage so as to stabilize the second AC. That is, the output voltage detection circuit 62 and the conversion controller 80 are configured to stabilize the second AC outputted by the AC output end.

In one embodiment, the AC input terminal 10 inputs the first AC within the predetermined voltage range, i.e., AC90-265V. The rectifier filter circuit 20 rectifies and filters the waveforms to form the first DC of high voltage in response to the control of the PWM controller 52, the switching circuit 30 outputs the first DC via a pulse format so as to output the pulse voltage. The pulse voltage is then applied with the voltage step-down process by the high voltage BUCK control step-down circuit 40 to generate the second DC. In addition, the floating zero potential control circuit controls the circuit in the floating manner, and stabilizes the second DC in accordance with a change of the high-voltage first AC outputted by the rectifier filter circuit. The second DC is converted by the full-bridge DC/AC converter circuit 50 and is applied with a PWM adjustment by the conversion controller 80 so as to output a stable second AC, i.e., which is generally around 110V. Thus, the wide voltage may be stepped down. As the input end may be the AC within the predetermined voltage range, such solution may be applicable to a large scope, such as being incorporated into a travel-use power conversion device.

In one embodiment, the smart matching step-down circuit further includes an output current detection circuit 61 connecting to current detection ends of the AC output terminal 70 and the conversion controller 80, and the output current detection circuit 61 is configured to sample the current of the second AC of the AC output terminal 70 to generate the sampling current. Correspondingly, the conversion controller 80 controls the duty cycle ratio of the outputted waveforms of the full-bridge DC/AC converter circuit 60 in accordance with the first sampling voltage and the sampling current, such that the second AC is stabilized. That is, in the embodiment, the full-bridge DC/AC converter circuit 60 references the current and the voltage of the AC output terminal 70 to control the duty cycle ratio of the outputted waveforms of the DC/AC converter circuit 60.

Figure 2:
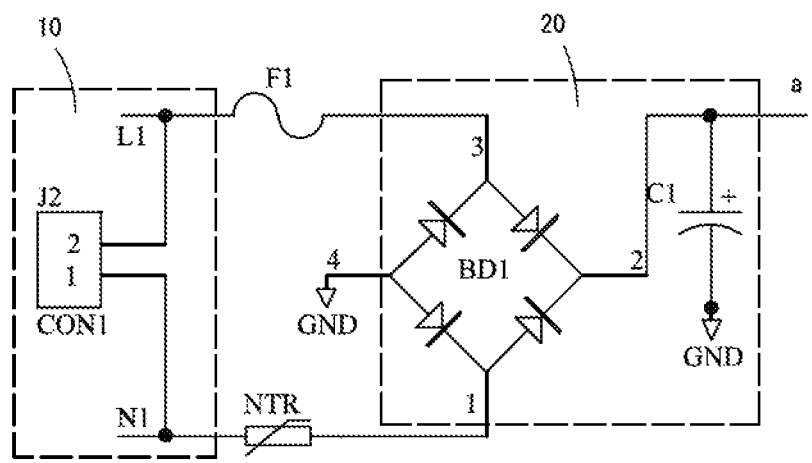
FIG. 2 is a circuit diagram of the rectifier filter circuit in accordance with one embodiment.

As shown in FIG. 2, in one embodiment, the rectifier filter circuit 20 includes a rectifying bridge (BD1) including four diodes and a filtering capacitor (C1). An input end of the rectifying bridge (BD1) connects to the AC input terminal 10, an output end connects to the positive pole of the filtering capacitor (C1) and a negative end of the filtering capacitor (C1) is grounded, wherein the first AC inputted from the AC input terminal 10 is rectified by the rectifying bridge (BD1), and is filtered by the filtering capacitor (C1) to form the first DC.

Referring to FIG. 3, the switching circuit 30 includes a MOS transistor (Q5) and a switch driving circuit. A drain of the MOS transistor (Q5) is the input end of the switching circuit 30, a gate of the MOS transistor (Q5) is the controlled end of the switching circuit 30, and a source of the MOS transistor (Q5) is the output end of the switching circuit 30. The switch driving circuit includes a twelfth diode (D10) and a twentieth resistor (R20). An anode of the twelfth diode (D10) and one end of the twentieth resistor (R20) connects to the gate of the first TFT (Q1), and a cathode of the twelfth diode (D10) and the other end of the twentieth resistor (R20) connects to the control end of the PWM controller 52, wherein the gate of the MOS transistor (Q1) receives the control signals of the PWM controller 52 so as to be turned on or off. The switching circuit 30 is controlled by the PWM controller 52 to output the pulse voltage.

The voltage detection and feedback circuit 50 includes an optoelectronic coupler (U5), a reference stabilized source (U6), and a voltage sampling circuit. A positive end of the LED of the optoelectronic coupler (U5) connects to the second end of the voltage step-down inductor (L1) within the switching circuit 30 via a power supply circuit, and a negative end of the LED of the optoelectronic coupler (U5) connects to the cathode of the reference stabilized source (U6). The anode of the reference stabilized source (U6) is grounded, and a reference pole of the reference stabilized source (U6) connects to the second end of the voltage step-down inductor (U1) within the switching circuit 30 via the voltage sampling circuit. A photo-triode of the optoelectronic coupler (U5) connects to the feedback end of the PWM controller 52, wherein the power supply circuit is configured to supply the power to the optoelectronic coupler (U5). The voltage sampling circuit obtains the voltage value from the second end of the voltage step-down inductor (L1) within the high voltage BUCK control step-down circuit 40, which is inputted from the reference pole of the reference stabilized source (U6) to the reference stabilized source (U6), and then is compared with the reference voltage to obtain the feedback message. The feedback message couples with the feedback end of the PWM controller 52 via the optoelectronic coupler (U5).

Specifically, the above power supply circuit includes a twenty-fifth resistor (R25) and a fourth voltage regulator diode (ZD4), a third voltage regulator diode (ZD3), a second voltage regulator diode (ZD2), and a fifth voltage regulator diode (ZD5) serially connected in sequence. One end of the twenty-fifth resistor (R25) connects to the fourth voltage regulator diode (ZD4), and the fifth voltage regulator diode (ZD5) connects to the second end of the voltage step-down inductor (L1) within the high voltage BUCK control step-down circuit 40.

The voltage sampling circuit includes a twenty-sixth resistor (R26), a twenty-seventh resistor (R27), and a twenty-eighth resistor (R28). The twenty-sixth resistor (R26) connects to the second end of the voltage step-down inductor (L1) within the high voltage BUCK control step-down circuit 40, the twenty-eighth resistor (R28) is grounded, and the reference pole of the reference stabilized source (U6) connects to the twenty-seventh resistor (R27) and the twenty-eighth resistor (R28), wherein the voltages of the twenty-sixth resistor (R26), the twenty-seventh resistor (R27), and the twenty-eighth resistor (R28) are divided, and one voltage value is obtained from the twenty-seventh resistor (R27) and the twenty-eighth resistor (R28). The voltage value is compared with the reference voltage of the reference stabilized source (U6) to generate the feedback message coupling with the feedback end of the PWM controller 52 via the optoelectronic coupler (U5).

The PWM controller 52 includes a PWM control chip (U4), i.e., UC 3843. The PWM control chip (U4) includes a COMP pin, a VFB pin, a CS pin, a RC pin, a Vref pin, a VCC pin, an OUT pin, and a GND pin, wherein the COMP pin connects to ends of a twenty-fourth resistor (R24) and a sixteenth capacitor (C16), and the other end of the twenty-fourth resistor (R24) and the sixteenth capacitor (C16) are grounded. The VFB pin is the feedback end, a collector of the photo-triode of the optoelectronic coupler (U5) connects to the COMP pin via a twenty-third resistor (R23), an emitter and the VFB pin are cooperatively grounded, the CS pin is grounded via the fourteenth capacitor (C14) and connects to the output end of the switching circuit 30 via an over-current detection circuit 51, the CS pin also connects to the Vref pin via an eighteenth resistor (R18), the RC pin is grounded via the fifteenth capacitor (C15), the Vref pin is grounded via the thirteenth capacitor (C13), the VCC pin connects to the DC power supply and is grounded via a twelfth capacitor (C12), the OUT pin is the control end connecting to the gate of the MOS transistor (Q5) via the switch driving circuit, and the GND pin is grounded.

The over-current detection circuit 51 includes a twenty-ninth resistor (R29) and a twenty-second resistor (R22). One end of the twenty-ninth resistor (R29) connects to the output end of the switching circuit 30, and the other end of the twenty-ninth resistor (R29) connects to the input end of the high voltage BUCK control step-down circuit 40. In addition, the other end of the twenty-ninth resistor (R29) is grounded. One end of the twenty-second resistor (R22) connects to the output end of the switching circuit 30, and the other end of the twenty-second resistor (R22) connects to the current detection end. The over-current detection circuit is configured for detecting the current of the MOS transistor.

Figure 4:
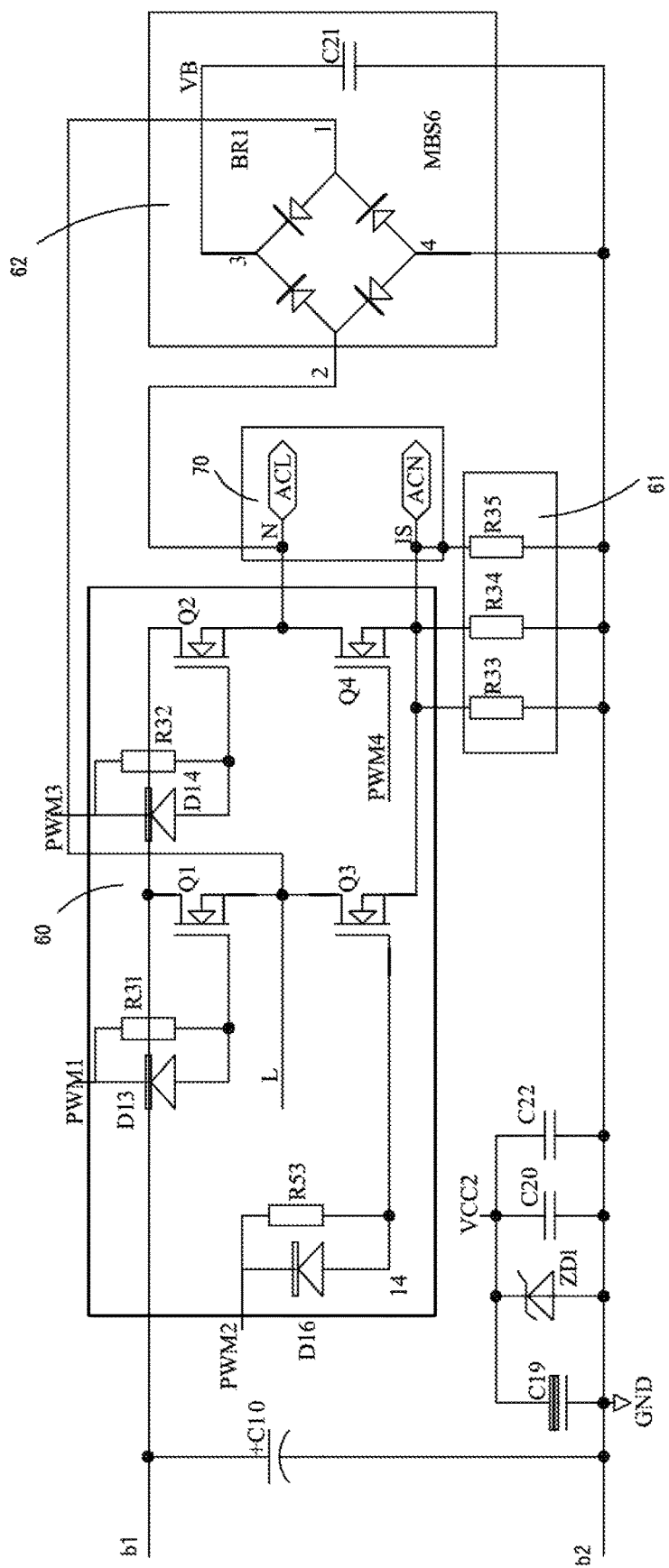
FIG. 4 is a circuit diagram of the full-bridge DC/AC converter circuit, the output voltage detection circuit, and the output circuit detection circuit in accordance with one embodiment.
Figure 5:
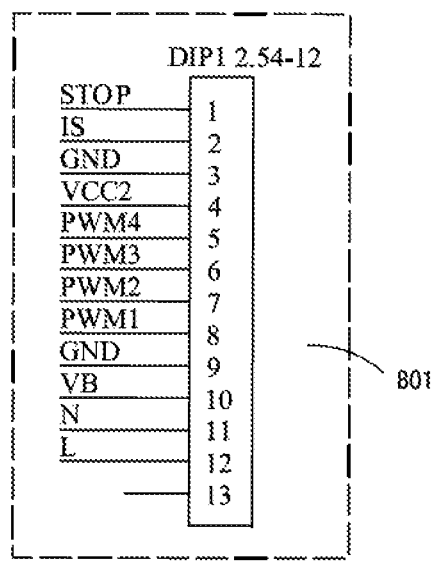
FIG. 5 is a circuit diagram of the terminals of the conversion controller of the smart matching step-down circuit in accordance with one embodiment.

As shown in FIG. 4, the full-bridge DC/AC converter circuit 60 includes an inverter-bridge including a first MOS transistor (Q1), a second MOS transistor (Q2), a third MOS transistor (Q3), and a fourth MOS transistor (Q4). Gates of the first MOS transistor (Q1), the second MOS transistor (Q2), the third MOS transistor (Q3), and the fourth MOS transistor (Q4) respectively connects to one MOS driving circuit. The MOS driving circuit includes one resistor (R31\R32\R53) and one diode (D13\D14\D16). The MOS driving circuit connects to the corresponding PWM control end of the conversion controller 80. The source of the second MOS transistor (Q2) is a fire-wire end of the AC output terminal 70, and the source of the fourth MOS transistor (Q4) is the zero-line end of the AC output terminal 70.

The output current detection circuit 61 includes a thirty-third resistor (R33), a thirty-fourth resistor (R34), and a thirty-fifth resistor (R35). Ends of the thirty-third resistor (R33), the thirty-fourth resistor (R34), and the thirty-fifth resistor (R35) connect to the source of the fourth MOS transistor (Q4) and the voltage detection end of the conversion controller 80, and the other ends of the thirty-third resistor (R33), the thirty-fourth resistor (R34), and the thirty-fifth resistor (R35) connect to the floating ground.

The output voltage detection circuit 62 includes a rectifying bridge (BR1). An AC L pin connects to the source of the first MOS transistor (Q1) and the L pin of the conversion controller 80, an AC N pin connects to the source of the fourth MOS transistor (Q4) and the N pin of the conversion controller 80, a DC positive pole pin of the rectifying bridge (BR1) connects to the floating ground via, a twenty-first capacitor (C21), an DC positive pole pin further connects to the VB pin of the conversion controller 80, and the DC negative pole pin connects to the floating ground.

The conversion controller 80 includes an interface end 801 having connecting ends, including PWM1, PWM2, PWM3, PWM4, VB, N, L, and IS. The connecting ends PWM1, PWM2, PWM3, PWM4 connects to the MOS driving circuit of the first MOS transistor (Q1), the second MOS transistor (Q2), the third MOS transistor (Q3), and the fourth MOS transistor (Q4), and the connecting end IS connects to the IS node of the output current detection circuit 61.

Basing on the above smart matching step-down circuit, the present disclosure also includes a travel-use power conversion device having the above smart matching step-down circuit.

In view of the smart matching step-down circuit and the travel-use power conversion device, the AC input terminal 10 inputs the first DC within a predetermined voltage range, i.e., AC90-265V. The rectifier filter circuit 20 rectifies and filters the waveforms to form the first DC of high voltage. In response to the control of the PWM controller 52, the switching circuit 30 outputs the first DC via the pulse format so as to output the pulse voltage. The pulse voltage is then applied with the voltage step-down process by the high voltage BUCK control step-down circuit 40 to generate the second DC of low voltage. In addition, the floating zero potential control circuit controls the circuit in the floating manner, and stabilizes the second DC in accordance with the change of the high-voltage first AC outputted by the rectifier filter circuit. The second DC is converted by the full-bridge DC/AC converter circuit 60 and is applied with the PWM adjustment by the conversion controller 80 so as to output a stable second AC, i.e., which is generally around 110V. Thus, the wide voltage may be stepped down. As the input end may be the AC within the predetermined voltage range, such solution may be applicable to a large scope, such as being incorporated into the travel-use power conversion device.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:
1. A smart matching step-down circuit, comprising:
an alternating current (AC) input terminal connects to an external power supply to input a first AC within a predetermined voltage range;
a rectifier filter circuit connects to the AC input terminal for rectifying and filtering waveforms of the first AC to form a first direct current (DC);
an input end of a switching circuit connects to the rectifier filter circuit, and in response to control signals, the switching circuit is turned on or off to output a pulse voltage;
a high voltage BUCK control step-down circuit comprises a voltage step-down inductor, and a voltage step-down filter capacitor, wherein a first end of the voltage step-down inductor connects to an output end of the switching circuit, and a second end of the voltage step-down inductor connects to a positive pole of the voltage step-down filter capacitor for performing a voltage step-down process and a filtering process toward the pulse voltage so as to output a second DC;

a floating zero potential control circuit comprises fly-back diodes, a cathode of the fly-back diodes and the first end of the voltage step-down inductor cooperatively connect to a floating ground;

a voltage detection and feedback circuit comprises an input end connecting to the second end of the voltage step-down inductor to detect the second DC so as to generate a feedback message;

a PWM controller comprises a feedback end connecting to an output end of the voltage detection and feedback circuit, and a control end connecting to a controlled end of the switching circuit, in response to the feedback message, the PWM controller is configured to output control signals controlling a pulse width of the pulse voltage;

a full-bridge DC/AC converter circuit comprises an input end connecting to a positive pole of the voltage step-down filter capacitor to convert the second DC to the second AC;

an AC output end connects to the output end of the full-bridge DC/AC converter circuit to output the second AC;

an output voltage detection circuit connects to the AC output end to sample voltages of the second AC from the AC output end so as to generate a first sampling voltage; and a conversion controller connecting to the output voltage detection circuit and the full-bridge DC/AC converter circuit, the conversion controller is configured to controlling a duty cycle ratio of outputted waveform of the full-bridge DC/AC converter circuit in accordance with the first sampling voltage so as to stabilize the second AC.

2. The smart matching step-down circuit as claimed in claim 1, wherein the smart matching step-down circuit further comprises an output current detection circuit connecting to current detection ends of the AC output terminal and the conversion controller, and the output current detection circuit is configured to sample current of the second AC from the AC output terminal to generate a sampling current;

the conversion controller controls the duty cycle ratio of the outputted waveforms of the full-bridge DC/AC converter circuit in accordance with the first sampling voltage and the sampling current to stabilize the second AC.

3. The smart matching step-down circuit as claimed in claim 1, wherein the switching circuit comprises a MOS transistor and a switch driving circuit, a drain of the MOS transistor is the input end of the switching circuit, a gate of the MOS transistor is a controlled end of the switching circuit, and a source of the MOS transistor is the output end of the switching circuit.

4. The smart matching step-down circuit as claimed in claim 1, wherein the voltage detection and feedback circuit comprises an optoelectronic coupler, a reference stabilized source, and a voltage sampling circuit, a positive end of at least one light emitting diode (LED) of the optoelectronic coupler connects to a second end of the voltage step-down inductor via a power supply circuit, and a negative end of the LED of the optoelectronic coupler connects to a cathode of the reference stabilized source, an anode of the reference stabilized source is grounded, and a reference pole of the reference stabilized source connects to the second end of the voltage step-down inductor via the voltage sampling circuit, and a photo-triode of the optoelectronic coupler connects to the feedback end of the PWM controller.

5. The smart matching step-down circuit as claimed in claim 1, wherein the full-bridge DC/AC converter circuit comprises an inverter-bridge having a first MOS transistor, a second MOS transistor, a third MOS transistor, and a fourth MOS transistor, gates of the first MOS transistor, the second MOS transistor, the third MOS transistor, and the fourth MOS transistor respectively connects to one MOS driving circuit, and the MOS driving circuit connects to the corresponding PWM control end of the conversion controller;

a source of the second MOS transistor is a fire-wire end of the AC output terminal, and a source of the fourth MOS transistor is a zero-line end of the AC output terminal.

6. The smart matching step-down circuit as claimed in claim 5, wherein the output current detection circuit comprises a thirty-third resistor, a thirty-fourth resistor, and a thirty-fifth resistor, ends of the thirty-third resistor, the thirty-fourth resistor, and the thirty-fifth resistor connect to a source of the fourth MOS transistor and the voltage detection end of the conversion controller, and the other ends of the thirty-third resistor, the thirty-fourth resistor, and the thirty-fifth resistor connect to the floating ground.

7. The smart matching step-down circuit as claimed in claim 5, wherein the output voltage detection circuit comprises a rectifying bridge, an AC L pin connects to the source of the first MOS transistor and a L pin of the conversion controller, an AC N pin connects to the source of the fourth MOS transistor and the N pin of the conversion controller, a DC positive pole pin of the rectifying bridge connects to the floating ground via a twenty-first capacitor, an DC positive pole pin further connects to a VB pin of the conversion controller, and the DC negative pole pin connects to the floating ground.

8. The smart matching step-down circuit as claimed in claim 1, wherein the smart matching step-down circuit further comprises an over-current detection circuit, the over-current detection circuit comprises a twenty-ninth resistor and a twenty-second resistor, one end of the twenty-ninth resistor connects to the output end of the switching circuit, and the other end of the twenty-ninth resistor is grounded, one end of the twenty-second resistor connects to the output end of the switching circuit, and the other end of the twenty-second resistor connects to a current detection end of the PWM controller.

9. A travel-use power conversion device comprises a smart matching step-down circuit, the smart matching step-down circuit comprising:

an alternating current (AC) input terminal connects to an external power supply to input a first AC within a predetermined voltage range;

a rectifier filter circuit connects to the AC input terminal for rectifying and filtering waveforms of the first AC to form a first direct current (DC);

an input end of a switching circuit connects to the rectifier filter circuit, and in response to control signals, the switching circuit is turned on or off to output a pulse voltage;

a high voltage BUCK control step-down circuit comprises a voltage step-down inductor, and a voltage step-down filter capacitor, wherein a first end of the voltage step-down inductor connects to an output end of the switching circuit, and a second end of the voltage step-down inductor connects to a positive pole of the voltage step-down filter capacitor for performing a voltage step-down process and a filtering process toward the pulse voltage so as to output a second DC;

a floating zero potential control circuit comprises fly-back diodes, a cathode of the fly-back diodes and the first end of the voltage step-down inductor cooperatively connect to a floating ground;

a voltage detection and feedback circuit comprises an input end connecting to the second end of the voltage step-down inductor to detect the second DC so as to generate a feedback message;

a PWM controller comprises a feedback end connecting to an output end of the voltage detection and feedback circuit, and a control end connecting to a controlled end of the switching circuit, in response to the feedback message, the PWM controller is configured to output control signals controlling a pulse width of the pulse voltage;

a full-bridge DC/AC converter circuit comprises an input end connecting to a positive pole of the voltage step-down filter capacitor to convert the second DC to the second AC;

an AC output end connects to the output end of the full-bridge DC/AC converter circuit to output the second AC;

an output voltage detection circuit connects to the AC output end to sample voltages of the second AC from the AC output end so as to generate a first sampling voltage; and a conversion controller connecting to the output voltage detection circuit and the full-bridge DC/AC converter circuit, the conversion controller is configured to controlling a duty cycle ratio of outputted waveform of the full-bridge DC/AC converter circuit in accordance with the first sampling voltage so as to stabilize the second AC.

10. The travel-use power conversion device as claimed in claim 9, wherein the smart matching step-down circuit further comprises an output current detection circuit connecting to current detection ends of the AC output terminal and the conversion controller, and the output current detection circuit is configured to sample current of the second AC from the AC output terminal to generate a sampling current;

the conversion controller controls the duty cycle ratio of the outputted waveforms of the full-bridge DC/AC converter circuit in accordance with the first sampling voltage and the sampling current to stabilize the second AC.

11. The travel-use power conversion device as claimed in claim 9, wherein the switching circuit comprises a MOS transistor and a switch driving circuit, a drain of the MOS transistor is the input end of the switching circuit, a gate of the MOS transistor is a controlled end of the switching circuit, and a source of the MOS transistor is the output end of the switching circuit.

12. The travel-use power conversion device as claimed in claim 9, wherein the voltage detection and feedback circuit comprises an optoelectronic coupler, a reference stabilized source, and a voltage sampling circuit, a positive end of at least one light emitting diode (LED) of the optoelectronic coupler connects to a second end of the voltage step-down inductor via a power supply circuit, and a negative end of the LED of the optoelectronic coupler connects to a cathode of the reference stabilized source, an anode of the reference stabilized source is grounded, and a reference pole of the reference stabilized source connects to the second end of the voltage step-down inductor via the voltage sampling circuit, and a photo-triode of the optoelectronic coupler connects to the feedback end of the PWM controller.

13. The travel-use power conversion device as claimed in claim 9, wherein the full-bridge DC/AC converter circuit comprises an inverter-bridge having a first MOS transistor, a second MOS transistor, a third MOS transistor, and a fourth MOS transistor, gates of the first MOS transistor, the second MOS transistor, the third MOS transistor, and the fourth MOS transistor respectively connects to one MOS driving circuit, and the MOS driving circuit connects to the corresponding PWM control end of the conversion controller;

a source of the second MOS transistor is a fire-wire end of the AC output terminal, and a source of the fourth MOS transistor is a zero-line end of the AC output terminal.

14. The travel-use power conversion device as claimed in claim 13, wherein the output current detection circuit comprises a thirty-third resistor, a thirty-fourth resistor, and a thirty-fifth resistor, ends of the thirty-third resistor, the thirty-fourth resistor, and the thirty-fifth resistor connect to a source of the fourth MOS transistor and the voltage detection end of the conversion controller, and the other ends of the thirty-third resistor, the thirty-fourth resistor, and the thirty-fifth resistor connect to the floating ground.

15. The travel-use power conversion device as claimed in claim 13, wherein the output voltage detection circuit comprises a rectifying bridge, an AC L pin connects to the source of the first MOS transistor and a L pin of the conversion controller, an AC N pin connects to the source of the fourth MOS transistor and the N pin of the conversion controller, a DC positive pole pin of the rectifying bridge connects to the floating ground via a twenty-first capacitor, an DC positive pole pin further connects to a VB pin of the conversion controller, and the DC negative pole pin connects to the floating ground.

16. The travel-use power conversion device as claimed in claim 9, wherein the smart matching step-down circuit further comprises an over-current detection circuit, the over-current detection circuit comprises a twenty-ninth resistor and a twenty-second resistor, one end of the twenty-ninth resistor connects to the output end of the switching circuit, and the other end of the twenty-ninth resistor is grounded, one end of the twenty-second resistor connects to the output end of the switching circuit, and the other end of the twenty-second resistor connects to a current detection end of the PWM controller.

* * * * *